C. E. REDDIG.
BELT ADAPTER.
APPLICATION FILED DEC. 22, 1919.

1,412,371.

Patented Apr. 11, 1922.

Inventor:
Charles E. Reddig
by Hubert A. Patterson
Att'y.

UNITED STATES PATENT OFFICE.

CHARLES E. REDDIG, OF RICHMOND HILL, NEW YORK, ASSIGNOR TO WESTERN ELECTRIC COMPANY, INCORPORATED, OF NEW YORK, N. Y., A CORPORATION OF NEW YORK.

BELT ADAPTER.

1,412,371.  Specification of Letters Patent.  Patented Apr. 11, 1922.

Application filed December 22, 1919. Serial No. 346,567.

*To all whom it may concern:*

Be it known that I, CHARLES E. REDDIG, a citizen of the United States, residing at Richmond Hill, Long Island, in the county of Queens and State of New York, have invented certain new and useful Improvements in Belt Adapters, of which the following is a full, clear, concise, and exact description.

This invention relates to an improved tread applicable to pulleys, sheaves, wheels and the like having substantially flat rims to adapt them to be driven by belts of substantially round cross-section. The invention further relates to an improved method of making such treads rapidly and inexpensively whereby they may be sold at a relatively small price.

Briefly, the invention consists in shaping a ribbon of steel or other suitable material to form a trough running longitudinally thereof and leaving flat flanges on each side of the trough providing means whereby the tread thus formed may be frictionally clamped to the flat rim of a pulley or wheel.

In the accompanying drawings, Figures 1, 2 and 3 illustrate the successive steps employed in forming the tread from a ribbon.

Figure 1:
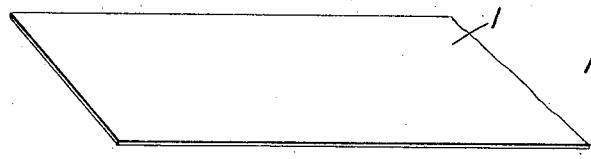
Figure 2:
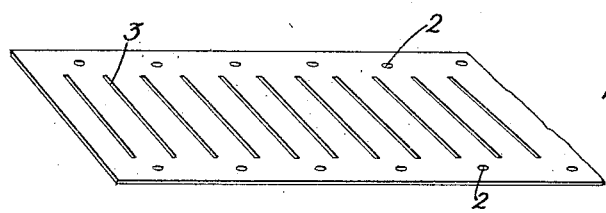
Figure 3:
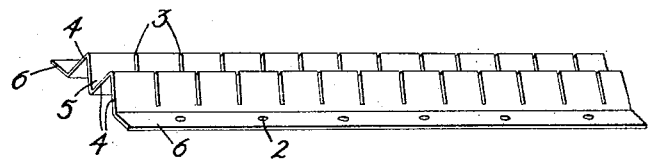

In fabricating the improved tread, a ribbon 1 of steel, fibre or other suitable material is perforated with a plurality of small holes 2 near each edge thereof and punched or otherwise provided with a plurality of transverse slits 3. The portion of the ribbon between the slits 3 is then crimped or formed M shape by any suitable means, forming inclined sides 4 and a trough 5. Portions of the ribbon adjacent each edge containing the perforations 2 are left flat forming longitudinal flanges 6 on each side of the M-shaped portion.

Figure 4:
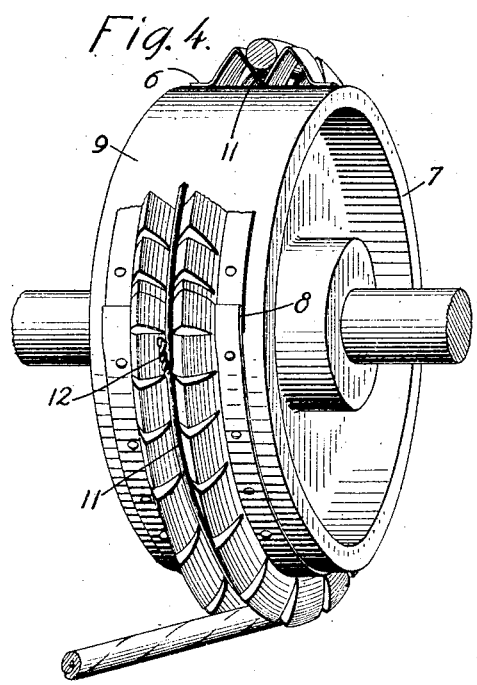
Figure 4 is a perspective view of a pulley with the tread attached thereto, part of the tread being broken away to more clearly show the position of the attaching means and the driving belt.
Figure 5:
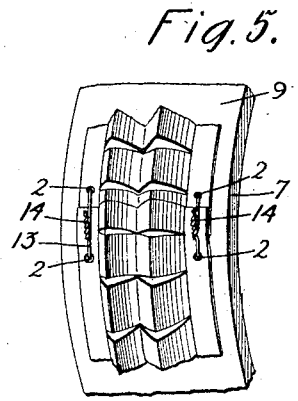
Figure 5 is a fragmentary perspective view of a rim with the tread attached thereto showing another form of attaching means.

A tread formed as above described is applicable to any pulley, sheave, or wheel having a substantially flat rim. Figures 4 and 5 illustrating the tread as applied to a pulley 7. In attaching the tread, a sufficient amount thereof is shaped around the rim of the pulley to permit its ends to slightly overlap, as is illustrated at 8, any surplus amount being cut off. The flanges 6 of the tread are positioned adjacent the flat rim 9 of the pulley and frictionally clamped thereagainst by means of a wire 11 drawn tight within the apex of the trough 5, having its ends twisted together as illustrated at 12.

In Figure 5, another form of clamping means is illustrated comprising lacings 13 which are threaded through holes 2 adjacent the ends of the tread, and are then drawn tight and their ends twisted together as shown at 14 to clamp the flanges 6 against the rim 9 of the pulley.

What is claimed is:

1. The combination with a pulley having a substantially flat rim, of a tread attachable thereto comprising a strip having a portion to receive a driving element of substantially round cross-section.

2. The combination with a pulley of a tread attachable thereto comprising a strip having flanges arranged adjacent the rim of the pulley wheel or the like and a portion to receive a driving element of substantially round cross-section.

3. The combination with a pulley having a substantially flat rim, of a tread attachable thereto comprising a strip having flanges arranged adjacent the rim and a trough shaped portion to receive a driving element and means for holding the tread upon the rim.

4. The combination with a pulley having a substantially flat rim, of a tread attachable thereto comprising a strip having flanges arranged adjacent the rim and a cross shaped portion to receive a driving element and means for frictionally holding the tread upon the rim.

5. The combination with a pulley having a substantially flat rim, of a tread attachable thereto having a trough shaped portion to receive a driving element and means fitting within the apex of the trough for holding the tread upon the rim.

6. The combination with a pulley having a substantially flat rim, of a tread attachable thereto having flanges positioned adjacent the rim, a trough shaped portion to receive a driving element, and means fitted within the apex of the trough shaped portion for frictionally clamping the flanges of the tread against the rim.

7. The combination with a pulley having a substantially flat rim, of a tread attachable thereto having flanges positioned adjacent the rim, a trough shaped portion to receive a driving element, and means encircling the rim and fitted within the apex of the trough shaped portion for frictionally clamping the flanges of the tread against the rim.

8. A tread attachable to pulleys having substantially flat rims, comprising a strip having flat flanges and a longitudinal trough shaped portion slotted at a plurality of points.

9. A tread attachable to pulleys having substantially flat rims, comprising a strip having flat flanges and a longitudinally extending M-shaped portion slotted at a plurality of points.

10. A tread attachable to pulleys comprising a strip having a trough shaped portion slotted at a plurality of points.

11. A tread attachable to pulleys comprising a strip having a longitudinally extending M-shaped portion slotted at a plurality of points.

12. A tread attachable to pulleys comprising a strip having a plurality of M-shaped portions to receive a driving element.

13. A tread attachable to pulleys having substantially flat rims, comprising a strip having a flat flange and a plurality of trough shaped portions to receive a driving element.

14. A tread attachable to pulleys having substantially flat rims, comprising a strip having flat flanges and a longitudinal trough shaped portion.

15. A tread attachable to pulleys having substantially flat rims, comprising a strip having flat flanges and a longitudinally extending M-shaped portion.

16. A supplemental rim for pulleys comprising a sheet metal band or strip provided between its side edges with means integral with said band or strip for forming a groove for the reception of a belt.

17. A supplemental rim for pulleys comprising a sheet metal band or strip provided with means between its edges cooperating to form a groove for the reception of a belt.

18. The combination with a pulley provided with a circular unflanged rim of a supplemental rim therefor comprising a metal band or strip encircling said unflanged rim and provided between its side edges with means for forming an annular groove for the reception of a belt, and means for detachably securing the said supplemental rim to the rim of the pulley.

19. A supplemental rim for pulleys comprising a sheet metal band or strip provided with struck up projections located between the side edges of said band or strip and forming a groove for the reception of a belt, and means for connecting together the ends of said band or strip.

20. A supplemental rim for pulleys comprising a sheet metal band or strip provided with projections cooperating to form a groove for the reception of a belt.

In witness whereof, I hereunto subscribe my name this 17th day of December A. D. 1919.

CHARLES E. REDDIG.